(12) United States Patent
Knebel et al.

(10) Patent No.: US 10,012,826 B2
(45) Date of Patent: Jul. 3, 2018

(54) METHOD AND OPTICAL ARRANGEMENT FOR MANIPULATING AND IMAGING A MICROSCOPIC SAMPLE

(71) Applicant: Leica Microsystems CMS GmbH, Wetzlar (DE)

(72) Inventors: Werner Knebel, Kronau (DE); Wernher Fouquet, Mannheim (DE); Frank Sieckmann, Eppingen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 166 days.

(21) Appl. No.: 14/778,926

(22) PCT Filed: Mar. 20, 2014

(86) PCT No.: PCT/EP2014/055661
§ 371 (c)(1),
(2) Date: Sep. 21, 2015

(87) PCT Pub. No.: WO2014/147207
PCT Pub. Date: Sep. 25, 2014

(65) Prior Publication Data
US 2016/0048012 A1 Feb. 18, 2016

(30) Foreign Application Priority Data

Mar. 20, 2013 (DE) .......................... 10 2013 204 959
Jul. 15, 2013 (DE) .......................... 10 2013 213 781

(51) Int. Cl.
*G02B 21/06* (2006.01)
*G02B 21/32* (2006.01)
(Continued)

(52) U.S. Cl.
CPC ......... *G02B 21/32* (2013.01); *G02B 21/0032* (2013.01); *G02B 21/0076* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS

2006/0250689 A1* 11/2006 Ulrich .................... G02B 21/06
359/385
2010/0193673 A1* 8/2010 Power ................ G02B 21/0032
250/251

(Continued)

FOREIGN PATENT DOCUMENTS

DE 19632040 A1 2/1998
DE 19834279 A1 3/2000
(Continued)

OTHER PUBLICATIONS

International Search Report from PCT/EP2014/055661, filed Mar. 20, 2014, dated Aug. 8, 2014.
(Continued)

*Primary Examiner* — Arnel C Lavarias
(74) *Attorney, Agent, or Firm* — Patentbar International, P.C.

(57) ABSTRACT

A method, in which a sample is manipulated with manipulation light, includes imaging the sample using a single plane illumination microscopy SPIM technique under illumination with illumination light being an illumination light sheet of fluorescent excitation light. Both the manipulation light and the illumination light are focused by an objective brought to an objective working position. Either the manipulation light or the illumination light are diverted after passing through the objective by use of a diverting device to propagate the manipulation light or the illumination light at an angle different from zero degrees with respect to an optical axis of the objective.

27 Claims, 7 Drawing Sheets

(51) Int. Cl.
*G02B 21/00* (2006.01)
*G02B 21/16* (2006.01)
*G02B 21/36* (2006.01)
*G02B 26/08* (2006.01)

(52) U.S. Cl.
CPC ........... *G02B 21/16* (2013.01); *G02B 21/367* (2013.01); *G02B 26/0816* (2013.01)

(58) Field of Classification Search
CPC ............ G02B 21/0036; G02B 21/0052; G02B 21/006; G02B 21/0076; G02B 21/06; G02B 21/08; G02B 21/082; G02B 21/084; G02B 21/086; G02B 21/088; G02B 21/16; G02B 21/32
USPC ....... 359/362, 363, 368, 369, 385, 387, 388, 359/389, 390
See application file for complete search history.

(56) References Cited

U.S. PATENT DOCUMENTS

| | | | | |
|---|---|---|---|---|
| 2013/0107358 A1* | 5/2013 | Knebel | ............ | G02B 21/0032 359/385 |
| 2015/0226670 A1* | 8/2015 | Kleppe | ............ | G02B 21/06 359/385 |
| 2016/0153892 A1* | 6/2016 | Knebel | ............ | G02B 21/0032 359/385 |
| 2016/0320301 A1* | 11/2016 | Knebel | ............ | G01N 21/47 |
| 2017/0131534 A1* | 5/2017 | Lippert | ............ | G02B 21/0076 |
| 2017/0160531 A1* | 6/2017 | Knebel | ............ | G02B 21/16 |
| 2017/0293131 A1* | 10/2017 | Paulus | ............ | G02B 7/182 |

FOREIGN PATENT DOCUMENTS

| | | |
|---|---|---|
| DE | 10257423 A1 | 6/2004 |
| DE | 102007047464 A1 | 4/2009 |
| DE | 102008018476 A1 | 10/2009 |
| DE | 202011110077 U1 | 1/2013 |
| EP | 1617255 A1 | 1/2006 |

OTHER PUBLICATIONS

Engelbrecht et al., Three-dimensional laser microsurgery in light-sheet based microscopy (SPIM), Optics Express, May 14, 2007, pp. 6420-6430, vol. 15, No. 10.
Huisken et al., Selective plane illumination microscopy techniques in developmental biology, Development 136, 2009, pp. 1963-1975.
Zanacchi et al., Two-photon fluorescence excitation within a light sheet based microscopy architecture, Multiphoton Microscopy in the Biomedical Sciences XI, Proc. of SPIE, 2011, pp. 1-5, vol. 7903, 79032W.
Yanik et al., Technologies for Micromanipulating, Imaging, and Phenotyping Small Invertebrates and Vertebrates, Annu. Rev. Biomed. Eng., 2011; pp. 185-217, vol. 13.

* cited by examiner

METHOD AND OPTICAL ARRANGEMENT FOR MANIPULATING AND IMAGING A MICROSCOPIC SAMPLE

RELATED APPLICATIONS

This Application is a U.S. National Stage Under 35 USC § 371 of International Application PCT/EP2014/055661, filed on Mar. 20, 2013, which in turn claims priority to German Patent Applications DE 10 2013 204 959.5, filed Mar. 20, 2013 and DE 10 2013 213 781.8, filed Jul. 15, 2013, all of which are incorporated herein by reference in their entirety.

FIELD OF THE INVENTION

The invention relates to a method in which a sample is manipulated with manipulation light, and in which the sample is imaged by means of the SPIM technique under illumination with illumination light, in particular excitation light for fluorescence excitation, in the form of an illumination light sheet.

The invention furthermore relates to an optical arrangement for manipulating a sample and for imaging the sample by means of the SPIM technique under illumination with illumination light, in particular excitation light for fluorescence excitation, in the form of an illumination light sheet.

BACKGROUND OF THE INVENTION

The SPIM technique (single plane illumination microscopy), in which the sample is illuminated in layers, allows image data to be sensed more quickly and with less sample impact than, for example, with spot-type scanning of a sample. One known area of application of SPIM technology is the field of fluorescence microscopy, fluorophores in the sample being excited with laser light. In SPIM technology, excitation occurs only in an illumination light sheet (also called a "light strip"). Damage to the sample resulting from illumination light in other planes is thereby avoided.

An optical apparatus operating according to the SPIM method is described in DE 102 57 423 A1. With this microscope a sample is illuminated with a thin light strip while observation occurs perpendicularly to the plane of the illuminating light strip. Illumination and detection occur here via two separate optical beam paths each having separate optics, in particular having two separate objectives perpendicular to one another. The light strip is generated by an illumination objective and by a cylindrical optic placed in front of it. For image acquisition, the sample is moved through the light strip, which is stationary with reference to the detector, in order to acquire fluorescent light and/or scattered light in layers using a planar detector. The layer image data thereby obtained can then be assembled into a data set corresponding to a three-dimensional image of the sample. This document does not disclose manipulation of a sample.

DE 20 2011 110 077 U1 discloses an arrangement for illuminating a sample in the context of SPIM microscopy. The arrangement comprises a light source for generating a light bundle, means for generating a light strip from the light bundle, and at least one objective which comprises an optic that is embodied and intended to deliver detected light proceeding from the sample to a detector, directly or indirectly. The arrangement furthermore comprises a diverting device, located after the optic of the objective, for diverting the light strip.

The combination of SPIM technology and optical sample manipulation is very attractive in principle, since the very fast SPIM technology, with low sample impact, is very well suited for observing the effects of manipulations of, in particular, relatively large, living organisms.

It is known from DE 10 2007 047 464 A1 to make available an additional manipulation light source whose manipulation light is coupled via a lens arrangement and mirror arrangement into the illumination beam path via an illumination objective. Alternatively, the same document proposes additionally coupling manipulation light into the detection beam path by means of dichroic mirrors, and directing it through the detection objective onto the sample. In an embodiment of this kind, in which manipulation light is delivered to the sample both via the illumination beam path and via the detection beam path, three beam splitters and two diaphragms must be laboriously inserted into the beam path. An advantage of this setup is that manipulation can take place from two directions. On the other hand, this results in a complex optical configuration and in light losses, at least on the illumination side.

The scientific publication "Selective plane illumination microscopy techniques in developmental biology," Huisken et al., Development 136, 1963-1975 (2009) discloses an apparatus of this kind in which a photomanipulation laser whose light is focused via the detection objective onto the sample is additionally provided. A largely similar arrangement is known from "Three-dimensional laser microsurgery in light-sheet based microscopy (SPIM)," Engelbrecht et al., Optica Express 6420, Vol. 15, No. 10 (2007). The article by Yanik et al., "Technologies for Micromanipulating, Imaging, and Phenotyping Small Invertebrates and Vertebrates," Annu. Rev. Biomed. Eng. 2011; 13: 185-217 also discloses a similar apparatus and method in which the samples are pumped through a capillary.

SUMMARY OF THE INVENTION

The object of the present invention is therefore to describe a method that enables particularly versatile and flexible sample manipulation and sample imaging.

The object is achieved by a method which is characterized in that both the manipulation light and the illumination light are focused by the same objective that is arranged in an objective working position, or by different objectives that are brought successively into an objective working position;

and that the manipulation light and/or the illumination light, after passing through the objective, is diverted by means of a diverting device in such a way that it propagates at an angle different from zero degrees with respect to the optical axis of the objective.

A further object of the present invention is to describe an optical arrangement of the kind recited previously that enables, with a simple optical configuration, particularly versatile and flexible sample manipulation and sample imaging.

This object is achieved by an optical arrangement which is characterized in that both the manipulation light and the illumination light are focused by the same objective that is arranged in an objective working position, or by different objectives that are brought successively into an objective working position;

and that downstream from the objective located in the objective working position is a diverting device that diverts the illumination light and/or the manipulation light.

The invention makes it possible for a sample to be manipulated and observed very flexibly and in a manner individually adjustable to the particular application. It becomes possible in particular to impinge upon the sample with manipulation light from different directions. For example, isocentric and, if desired, periodically repeating impingement upon one and the same sample region of interest with manipulation light from very different directions is also enabled; this is explained in detail later on. The invention also makes it possible in particular to perform coherent, simultaneous illumination of a sample region of interest.

It is also possible, particularly advantageously, to impinge upon a sample region of interest with manipulation light in a manner analogous to stereotactic irradiation, as is used in radiation therapy e.g. for tumor treatment. The sample region can be positioned, for example, by displacing the sample with the aid of a suitable displacement stage, adjustable preferably in all three spatial directions, on which the sample is mounted. The displacement stage can in particular be embodied to be adjustable in motorized fashion.

The invention has the further, very particular advantage that illumination light and manipulation light can strike the sample from different directions. As a result, for example, of displacement of the diverting device relative to the objective, and/or as a result of use of an adjustable beam deflection apparatus for the manipulation light and/or illumination light, there are almost no limits in terms of possible directions and angles of incidence onto the sample. In particular, the user is not limited to impinging upon the sample with illumination light and/or manipulation light exclusively along the optical axis of the objective or perpendicular to the optical axis of the objective.

In particular with this as well in mind, the invention has the very particular advantage that laborious switching over between long sub-beam paths and a large number of dichroic mirrors for coupling the manipulation light in or out can largely be dispensed with, even though the versatility of the arrangement according to the present invention is in fact greater than with arrangements known from the existing art. The instabilities and additional costs that necessarily arise when a plurality of long, different beam paths are used are thereby avoided.

It is in fact advantageously possible in this regard to convert a scanning microscope, in particular a confocal scanning microscope, at a later time, without major technical outlay in order to produce an optical arrangement according to the present invention and/or in order to carry out the method according to the present invention.

Very accurate, minimally invasive microscopic manipulations can be carried out, for example, by means of optical sample manipulation. The properties of the manipulation light, for example in terms of wavelength and/or light power level and/or intensity and/or in terms of the geometric shape of one or more manipulation light bundles, is preferably adapted to the particular application. For example, the manipulation light can be pulsed. It is also possible to use unpulsed manipulation light.

The arrangement according to the present invention preferably contains in this context a light source, in particular a laser light source, suitable for the particular application or adaptable to the particular application, in particular in terms of the aforementioned properties. In the context of the optical arrangement according to the present invention, for example, one and the same illumination device can be used to generate both the manipulation light and the illumination light. It is also possible, however, for different light sources to be present for generating the manipulation light and the illumination light.

Ultraviolet (UV) light is a highly energetic light that can be used, for example, for cell ablation, DNA cutting, and microsectioning. Usual wavelengths of 405 nm can, however, also be used for photoactivation and photoconversion. Visible (VIS) light can be used for bleaching experiments on fluorescing dyes (FRAP—fluorescence recovery after photobleaching). Visible light can also be used, however, for photoactivation and photoconversion. Using infrared (IR) light, damage can be introduced in highly controlled, very low-impact, and locally limited fashion by abruptly elevating the temperature, for example a water temperature, by impingement with infrared light within a very small volume. Direct absorption by the tissue is likewise possible. IR light can also be used in conjunction with optical tweezers. In addition, infrared manipulation light can be used for the processes already described, such as cell ablation, photobleaching, photoactivation, and photoconversion, by the fact that biological structures interact with the infrared manipulation light via the multi-photon (MP) excitation principle.

Advantageously, it is possible according to the present invention in particular, in contrast to apparatuses known from the existing art, also to manipulate a sample from appreciably more than only two directions if necessary. The use of an adjustable beam deflection apparatus (for example two galvanometer mirrors connected in series, one deflecting in the X direction and one in the Y direction) allows manipulations to be performed, for example, using spot, linear, and freely selectable area manipulation illumination. It is possible in particular to manipulate sample regions of interest (ROI) of any shape in controlled fashion by impingement with manipulation light.

The diverting device can, for example, comprise one or more mirrors. The mirror can, in particular, be flat. It is also possible, however, for the mirror to be curved, for example if the illumination light and/or manipulation light is to be moved continuously along the mirror surface and/or if additional focusing is to be achieved. It is also possible, alternatively or additionally, for the diverting device to comprise at least one prism or at least one dichroic beam splitter.

In one possible embodiment, provision is made that both the manipulation light and the illumination light is focused onto the sample through the same objective, which is arranged in an objective working position. Such an embodiment makes it possible in particular to impinge upon the sample simultaneously with manipulation light and illumination light, and to observe sample reactions that occur quickly after a manipulation.

An embodiment of this kind has the particular advantage that the same numerical aperture of the objective acts both on the illumination light and on the manipulation light; and that if desired, the manipulation light can thus exhibit the same divergence as the illumination light.

It is also possible, however, when the same objective is used for the manipulation light and for the illumination light, for the sample to be impinged upon at separate times with the manipulation light and with illumination light.

In the case of impingement with a separation in time, it is possible in particular to cause the manipulation light, after passing through the objective, to be incident onto the sample directly, with no diversion by the diverting device, whereas the illumination light, once it has passed through the objective, is diverted with the diverting device in such a way that it propagates at an angle different from zero degrees, in particular at an angle greater than 10 degrees, very particularly at a right angle, with respect to the optical axis of the objective. It must be considered here, however, that the foci of the illumination light and manipulation light are not at the same spacing from the objective; this can be compensated for, for example, by displacing the objective by an amount equal to the difference in spacing along the optical axis when switching over between impingement with manipulation light and with illumination light.

It is also possible, when switching over between impingement with manipulation light and with illumination light, also to switch over between different objectives, specifically by introduced the respectively required objective into the objective working position, in order to avoid the aforesaid problem of the spacing difference. The refractive power of the objectives is selected in this context in such a way that the respective focal spacing with respect to the objective working position is the same for the illumination light proceeding through the diverting device as it is for the manipulation light not proceeding through the diverting device.

Leaving aside this embodiment, a change in objective can also be accomplished for other reasons, including in such a way that the spacing difference is compensated for not by the different refractive power but instead, for example, by displacement (already mentioned above) of the objective along the optical axis.

The displaceability or movability of the objective can be implemented with an electric motor or with a mechanical drive. Movability in the X, Y, and/or Z direction, for example, can be implemented by means of piezo elements or conventional drive technologies.

If it is desired, for example, to carry out a manipulation, for example by means of a spot, linear, or freely selectable area manipulation illumination, at a numerical aperture that is higher than the one for the illumination light, according to one possible embodiment of the invention this can be achieved by pivoting in an illumination objective having a higher numerical aperture for manipulation, and by pivoting back to the original illumination objective, having a lower numerical aperture, for observation and illumination with illumination light. In order to allow manipulation in the same focus region in which regular illumination is also occurring, a displacement along the optical illumination axis must be carried out upon the change in objective.

The usability of high-aperture objectives has the particular advantage that the conformation of the illumination light sheet and/or of a manipulation light bundle can be particularly thin. With respect to SPIM imaging, resolution is thereby increased.

If it is desired, for example, to carry out illumination and manipulation, for example by means of a spot, linear, or freely selectable area illumination, using the same objective, in particular one having a high numerical aperture, this can be achieved according to one possible embodiment of the invention by shifting the objective that focuses the manipulation light and the illumination light laterally (i.e. transversely to the optical axis) by a predetermined amount, thereby ensuring that the diverting device is still struck. The reason for this is that objectives having a high numerical aperture are typically also higher-magnification objectives, i.e. having a smaller scan field. If it is still desired, however, to position a large opening of the diverting device, and thus larger objects, between the diverting devices, the illumination objective must be offset laterally by a specific amount so that the diverting device is still struck by the scanning beam. If the magnification of the illumination objective increases by a factor of 2, a lateral shift of the illumination objective must occur by an amount calculated as: [(scan field of the lower magnification) minus (scan field of the higher magnification)] divided by 2. If the intention is to carry out the manipulation not via the diverting device but instead directly, and to manipulate in the focal plane while also illuminating via the diverting device, the objective must be shifted along the optical axis by a specific amount; this amount is typically calculated as half the opening of the diverting device (in mm). Other values can, however, also be used if one wishes to manipulate other regions of the sample.

The light sheet can be generated, for example, using a cylindrical optic, for example from a light bundle (e.g. of a laser) having a round cross section. For purposes of the present invention a "cylindrical optic" is understood as any astigmatic optic and/or any optic that focuses more strongly in one direction perpendicular to the propagation direction of the light than in another direction perpendicular to the propagation direction of the light.

In a very particularly advantageous embodiment, however, provision is made that the illumination light sheet is a quasi-light sheet that is made up of an illumination light bundle moved continuously back and forth in a light sheet plane. The optical apparatus can comprise for this purpose, for example, a beam deflection apparatus adjustable in terms of deflection angle, with which an illumination light bundle is preferably movable in an illumination plane so quickly that an illumination light sheet exists de facto in the illumination light plane; and/or that said illumination is not distinguishable, with the detectors provided for detection of the light proceeding from the sample and with the downstream evaluation apparatuses of a microscope, from a continuous illumination light sheet generated, for example, with a cylindrical optic; and/or that the acquired image data cannot, or cannot substantially, be distinguished from the data that would be generated upon illumination with a continuous illumination light sheet.

A beam deflection device of this kind can comprise, for example, at least one galvanometer mirror. In particular, for example, the beam deflection apparatus of a scanning microscope, in particular of a confocal scanning microscope, which apparatus is present in any case, can also be used, in particular if the optical arrangement is produced by conversion of a scanning microscope, or if the method according to the present invention is carried out with the aid of a scanning microscope.

In particular when the shape of the light sheet is to be adjustable, it is particularly advantageous if the beam deflection apparatus comprises multiple galvanometer mirrors, preferably deflecting in different deflection planes that in particular are mutually perpendicular, for example an X galvanometer mirror and a Y galvanometer mirror, or other adjustable deflection means. The advantage of multiple deflection means becomes evident in particular using the example of generating a flat quasi-light sheet utilizing a diverting device that comprises one or more curved diverting mirrors: if a curved diverting mirror were illuminated solely by deflecting an illumination light beam in one plane, that would then (because the track of the illumination light beam on the curved diverting mirror is necessarily curved) result in a quasi-light sheet that is not flat but curved. With the use of two galvanometer mirrors deflecting in different deflection planes, however, it is possible to draw the track of the illumination light beam on the diverting mirror in such a way that the result is a flat quasi-light sheet.

Conversely (even in the context of use of a flat diverting mirror) it is also possible, if desired, to generate a quasi-light sheet of largely any configuration by appropriate control of the galvanometer mirror.

The light sheet plane in which the diverted illumination light sheet propagates is preferably aligned transversely to the optical axis of the illumination objective and/or of the detection objective.

As already mentioned, provision can advantageously be made that the illumination light and/or the manipulation light is directed, in particular using a beam deflection apparatus adjustable in terms of deflection angle, through the objective and optionally via further optical elements onto the diverting device.

In particular, provision can also advantageously be made that the illumination light and/or manipulation light is diverted, simultaneously or sequentially, using a diverting device having multiple diverting means, in particular diverting mirrors, which device is downstream from the objective located in the objective working position.

The diverting means can in particular be arranged differently and/or be aligned differently and/or be of different types. Provision can be made, for example, that, in particular by means of a beam deflection apparatus adjustable in terms of deflection angle, the manipulation light and/or the illumination light are directed alternately onto differently positioned and/or oriented diverting means, where each diverting means diverts the manipulation light and/or illumination light onto the sample, in particular onto the same sample region. It is thereby possible for one and the same sample region to be impinged upon with manipulation light from different directions.

This makes possible, in particular, an isocentric and/or stereotactic impingement onto one and the same sample region. A sample region of interest can thereby, for example, be intensively impinged upon with manipulation light while the surrounding regions are spared, in particular because the effect of the incident manipulation light is distributed outside the sample region. It is possible in particular, for example, for the manipulation light, constituting a manipulation light beam, to be moved on a conical surface, in particular using a beam deflection apparatus adjustable in terms of deflection angle, and via a diverting device downstream from the objective which comprises, in particular, multiple diverting means.

For particular applications, for example if different sample regions are to be manipulated differently, the power level of the manipulation light can be modified during a manipulation and/or during a beam deflection.

It is also possible for a diverting device to comprise multiple diverting means; or to be shaped, in particular curved, in such a way that the illumination light and/or manipulation light can be directed from different directions onto the sample, in particular onto a sample region of interest.

In one possible embodiment the detected light proceeding from the sample passes in through, and/or is collimated by, the objective that focuses the illumination light.

Preferably, however, the detected light proceeding from the sample passes through, and/or is collimated by, a detection objective that is different from the objective that focuses the illumination light and/or the manipulation light.

In particular, provision can advantageously be made that the optical axis of the objective that focuses the illumination light and/or the manipulation light, and the optical axis of the detection objective, are aligned with one another in parallel and/or collinear fashion. An embodiment of this kind has the particular advantage that the optical apparatus can be of particularly compact and robust configuration, and that the sample illumination region is particularly easily accessible, thus enabling rapid and precise successive introduction of samples into the sample illumination region.

In particular, provision can advantageously be made that the illumination light sheet firstly proceeds in a vertical direction through the illumination objective and is then diverted into a horizontal direction using the diverting device in order to illuminate a layer of the sample. The light proceeding from the illuminated layer, in particular fluorescent light, preferably proceeds in a vertical direction through a detection objective. A configuration of this kind makes possible the use of standard upright or inverted microscope stands to produce the optical apparatus according to the present invention.

In a very particularly advantageous embodiment, provision is made that the objective that focuses the illumination light and/or manipulation light, and the diverting device which can comprise, for example, one or more diverting mirrors, are arranged movably relative to one another. Alternatively or additionally, provision can also be made that the diverting device is fastened movably on the objective that focuses the illumination light and/or manipulation light, and/or that the diverting device is fastened movably on the detection objective. These embodiments have the advantage that it is easy to adjust whether the illumination light and/or manipulation light strikes the sample directly, or via the diverting device. In addition, by way of the adjustment of the relative position between the diverting device and the objective that focuses the illumination light and/or manipulation light, it is possible to modify the direction of incidence of the illumination light and/or of the manipulation light onto the sample.

It is also possible, alternatively or additionally, for the deflection device to be rotatably arranged around the detection objective and/or around the optical axis of the detection objective, in particular fastened on the detection objective. Such an embodiment makes it easily possible, for example, to adjust or modify the direction of incidence of the illumination light and/or of the manipulation light onto the sample.

Provision can advantageously be made that a two-photon excitation is brought about using the manipulation light and/or the illumination light. The optical arrangement according to the present invention can in that regard advantageously comprise a pulsed laser, in particular a picosecond or femtosecond laser, for generating the illumination light and/or manipulation light.

As already mentioned, the optical arrangement according to the present invention can be produced by converting a scanning microscope, in particular a confocal scanning microscope. It is also possible for the optical arrangement according to the present invention to contain a scanning microscope, in particular a confocal scanning microscope, preferably in such a way that said arrangement, independently from generation of a SPIM image, can also be operated as a scanning microscope.

As already mentioned, in a particularly simply designed fashion, the diverting device can be arranged on a detection objective, arranged on the detection side, of the detection device. This elegantly utilizes an existing component in the form of the detection objective in order to position securely thereon the diverting device necessary for generation of the light sheet. In the interest of particularly high flexibility and simple adaptation to different requirements in the context of utilization of the optical arrangement, the diverting device can be arranged, in particular in nondestructively removable fashion, on the detection objective. In other words, the diverting device can be arranged on the detection objective for a microscopy application using an illumination light sheet, and can be removed from the detection objective for a different desired illumination. In addition, differently dimensioned diverting devices can be used alternately, and can easily be exchanged in the event of damage.

The diverting device can comprise, for example, a mirror arrangement having preferably multiple reflecting elements and/or having at least one prism and/or at least one dichroic beam splitter. Also in simple fashion, the diverting device can be arranged on the front side of the detection objective.

The mirror arrangement can, in simple fashion, comprise two flat and mutually oppositely located reflecting elements for illumination and/or manipulation of the sample from two sides. In the interest of particularly reliable avoidance of shadowing in the region of the sample, the mirror arrangement can comprise multiple flat or curved reflecting elements that can be arranged along a circular arc of predefinable length. The individual reflecting elements can be implemented in a single mirror attachment, so that the relative positioning of the reflecting elements with respect to one another is predefined upon manufacture of the mirror attachment.

Also advantageously, the radius of curvature of the curved reflecting elements can be selected in such a way that all the beams reflected from the reflecting elements, or a predefinable number of beams from the reflecting elements, meet at one focal point. The highest beam load is then located at this focal point; it can be provided at the center of the sample. For focusing of this kind at a single focal point, the radius of curvature is equal to the radius that extends from the center of the sample to the circular arc of the reflecting elements arranged along the circular arc. For illumination using a light sheet, the radius of curvature should be greater then two such radii from the center of the sample to the circular arc.

BRIEF DESCRIPTION OF THE DRAWINGS

The subject matter of the invention is schematically depicted in the drawings and will be described below with reference to the Figures, identically functioning elements being labeled with the same reference characters. In the drawings.

DETAILED DESCRIPTION OF THE PREFERRED EMBODIMENTS

Figure 1:
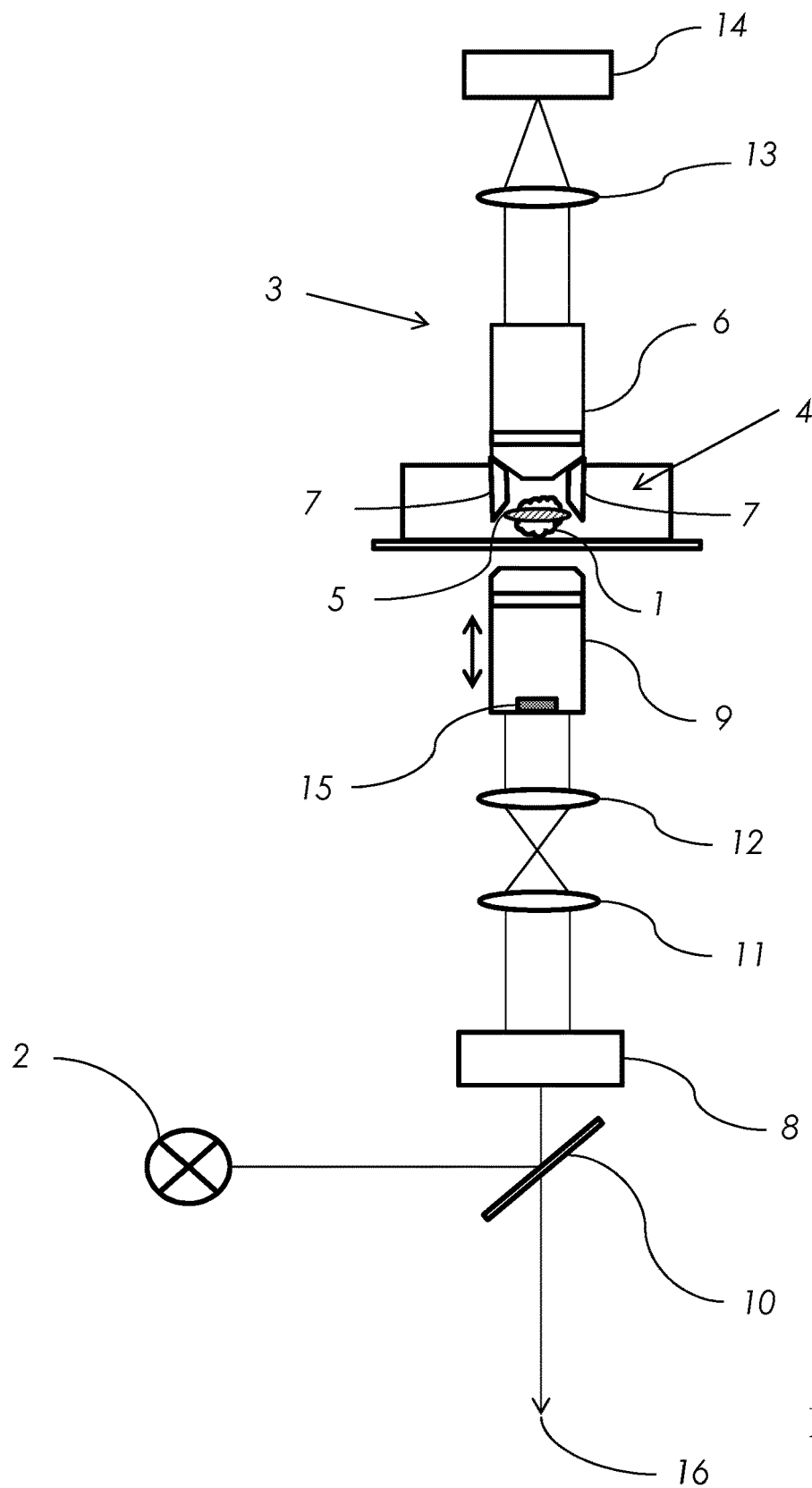
FIG. 1 is a schematic side view of an exemplifying embodiment of the optical arrangement according to the present invention.

FIG. 1 is a schematic side view of an exemplifying embodiment of an optical arrangement according to the present invention for manipulating a sample 1 and for imaging a sample using the SPIM technique under illumination with illumination light, in particular excitation light for fluorescence excitation, in the form of an illumination light sheet 5. The illumination light has been generated by a light source (not depicted in this Figure) and travels through a beam splitter 10 to an adjustable beam deflection apparatus 8 and then passes via a scanning lens 11 and a tube lens 12 through entrance pupil 15 of an objective 9, arranged in an objective working position, that focuses the illumination light. After passing through objective 9, the illumination light is diverted by means of a diverting device 4, which comprises diverting mirrors 7, in such a way that it propagates at an angle different from zero degrees with respect to the optical axis of objective 9.

Beam deflection apparatus 8 can be embodied in particular to deflect incident light mutually independently in two different directions (in particular an X direction and a Y direction). For example, beam deflection apparatus 8 can contain two galvanometer mirrors whose rotation axes are arranged in mutually perpendicular planes. Alternatively, beam deflection apparatus 8 can also comprise, for example, a gimbal-mounted mirror.

Illumination light sheet 5, which is depicted only very schematically in the Figure, is preferably a quasi-light sheet that has been generated by the fact that the illumination light, emitted from the light source (not depicted) in the form of an illumination light bundle, is moved rapidly back and forth by means of beam deflection apparatus 8. A homogeneous intensity distribution, in particular, can be achieved thereby. It is also possible, however, to create illumination light sheet 5 by means of an astigmatic optic.

Detected light proceeding from that layer of the sample which is illuminated with illumination light sheet 5 is detected using a detection apparatus 3. The detected light is collimated by means of a detection objective 6, and is then imaged by means of an optic 13 onto a detector 14 that can be embodied, for example, as an area detector, in particular as a CCD camera or as a CMOS-based sensor. The detector generates electrical signals that can be used (optionally after electronic processing) to present the sample on a monitor. By shifting the sample along the optical axis of the objective it is possible to obtain successively a stack of two-dimensional images that can be assembled into a three-dimensional depiction.

In this fashion, for example, firstly a first image of the sample or of at least one sample layer or of a sample region of particular interest can be obtained, in order then to carry out (as described below) a manipulation whose effects can then be made visible again in order to generate a further image.

The optical apparatus comprises a further light source 2 that emits manipulation light. The manipulation light generated by the light source 2 is diverted by beam splitter 10 to beam deflection apparatus 8 and then travels via scanning lens 11 and tube lens 12 to objective 9 arranged in the objective working position. Objective 9 also focuses the manipulation light. Beam deflection apparatus 8 directs the manipulation light not, however, onto one of the diverting mirrors 7 as it did the illumination light previously, but instead in such a way that after passing through objective 9 it strikes sample 1 directly.

Consideration must be given here to the fact that the foci of the illumination light and manipulation light have different positions within the sample, so that the region previously illuminated with the focus of the illumination light sheet cannot be manipulated using the focus of the manipulation light.

This is corrected by displacing objective 9 along the optical axis, as indicated in the Figure by the double arrow. The displacement travel is preferably as large as the original difference in the spacing of the foci relative to the objective.

Figure 2:
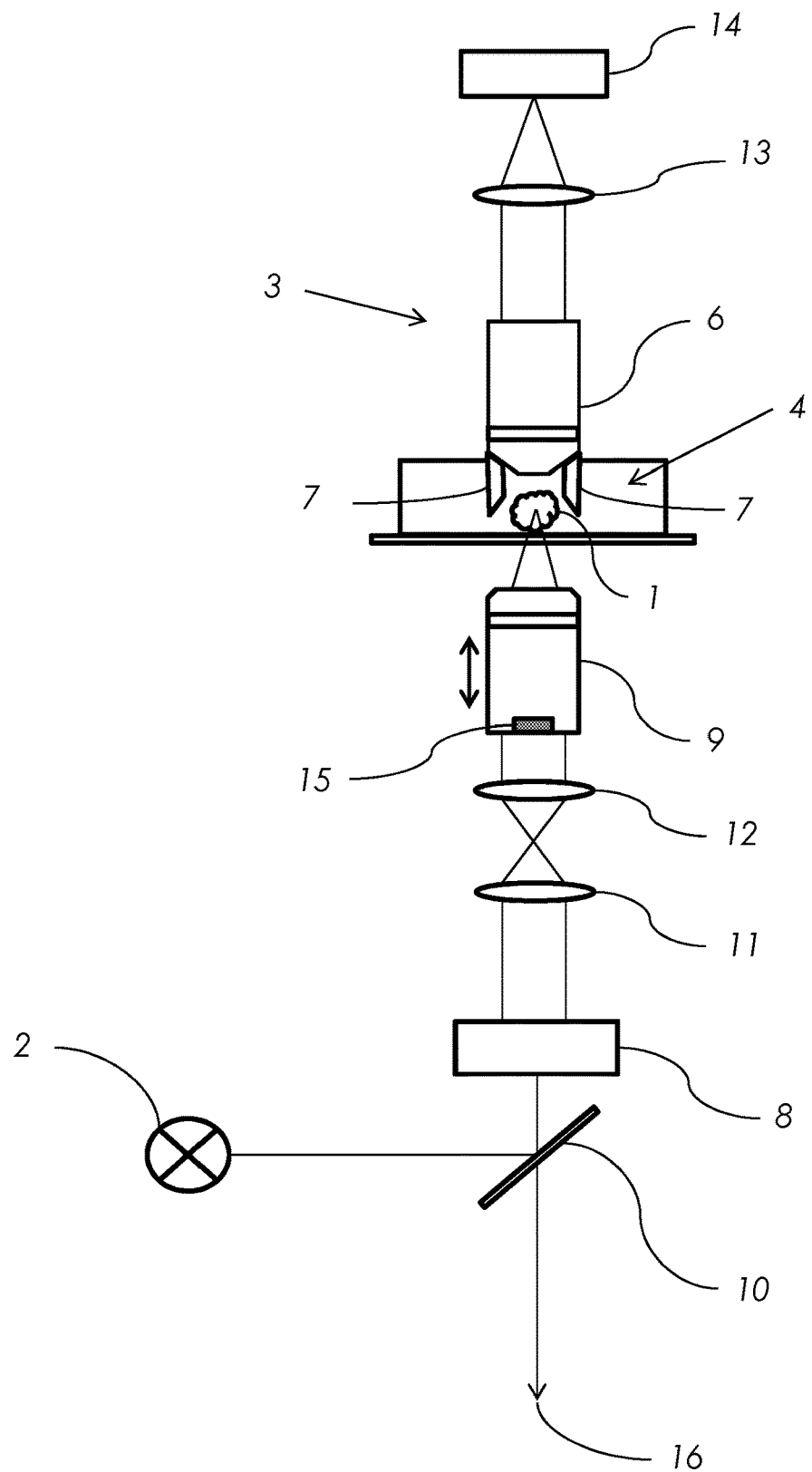
FIG. 2 is a schematic side view of the exemplifying embodiment of the optical arrangement according to the present invention, having an illumination objective positioned differently than the one in FIG. 1.

FIG. 2 shows the position necessary for performing a manipulation, with an increased sample-to-objective spacing. As described above in detail, however, compensation can also be effected in a different manner, for example by using additional optics (in particular exclusively in that part of the beam path in which exclusively the manipulation light propagates, for example between the further light source 2 and beam splitter 10) and/or by using different objectives for illumination and manipulation.

Once manipulation has occurred, the object can be displaced back again in order to generate again, in the manner described above, an image of the sample, in particular of the manipulated sample region.

Diverting device 4 is arranged on detection objective 6. Diverting device 4 comprises two diverting mirrors 7 to allow the sample to be illuminated selectably from two sides. This allows, in particular, for illumination from one side onto structures that, for example because of shadowing by parts of the sample itself, cannot be impinged upon, or can be impinged upon only insufficiently, with light from the other side.

It is additionally possible also to collimate, by means of objective 9 located in the objective working position, further detected light 16 proceeding from the sample, and to deliver it to a detector (not depicted in the Figures). Beam splitter 10 is in this context embodied in such a way that detected light 16 can pass.

Figure 3:
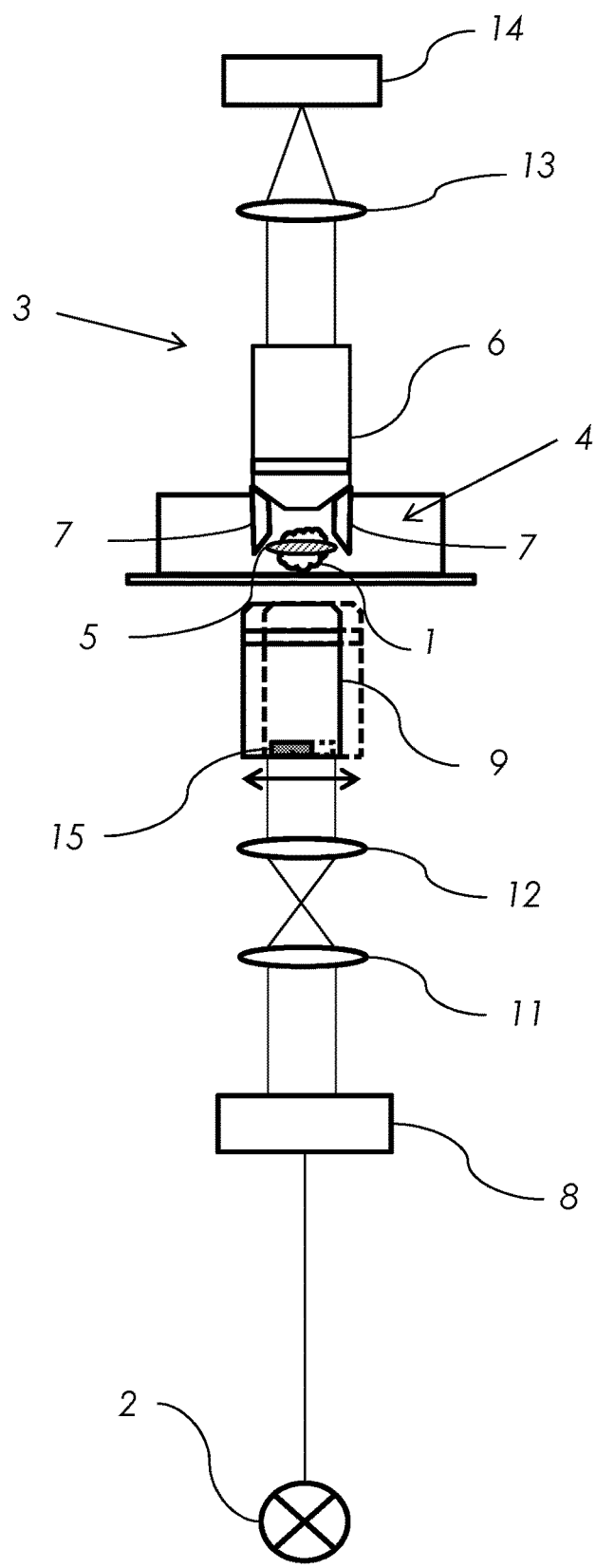
FIG. 3 is a schematic side view of an exemplifying embodiment of another optical arrangement according to the present invention in which the illumination object is laterally offset.

FIG. 3 is a schematic side view showing an exemplifying embodiment of another optical arrangement according to the present invention that allows an objective 9 having a high numerical aperture also to be used. Objectives having a higher numerical aperture typically have the advantage of high resolution capability, but have a smaller field of view (scan field). In the case of the arrangement depicted in the Figure, provision is therefore made for shifting objective 9 laterally (indicated by the double arrow and the two depictions of objective 9) so that the diverting device is struck even when objectives 9 having a high numerical aperture are used. In addition to the lateral displacement, a displacement along the optical axis of objective 9 is preferably additionally performed in order to maintain the illumination and detection geometry.

Instead of two light sources for separately generating the manipulation light and illumination light, provision can alternatively be made for both the manipulation light and the illumination light to be generated by the same light source. This could be, for example, light source 2. Depending on the particular application, light source 2 can be embodied to generate UV and/or IR and/or visible light.

FIGS. 4 to 7 show, in a plan view looking along the optical axis of objective 9, different exemplifying embodiments of diverting devices 4 having differently embodied and differently arranged diverting mirrors 7 and possible beam paths of the manipulation light and/or illumination light.

Figure 4:
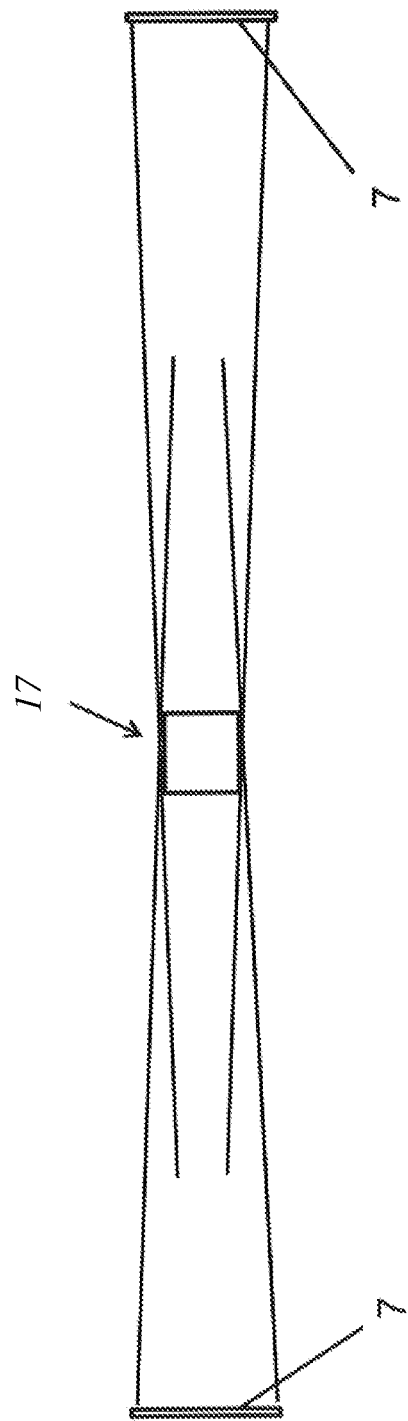
FIG. 4 schematically depicts a possible diverting device.

FIG. 4 is a schematic view showing one possible diverting device 4 having two diverting mirrors 7 that are arranged opposite one another. The diverting mirrors deflect the illumination light, which is embodied as an illumination light sheet, for illumination of a field of view 17 in which the sample or at least a portion of the sample is positioned. Field of view 17 preferably corresponds to the region that is imaged onto a detector, in particular a two-dimensional detector. It is of course also possible, alternatively or additionally, to direct manipulation light onto a sample by means of diverting mirrors 7.

Figure 5:
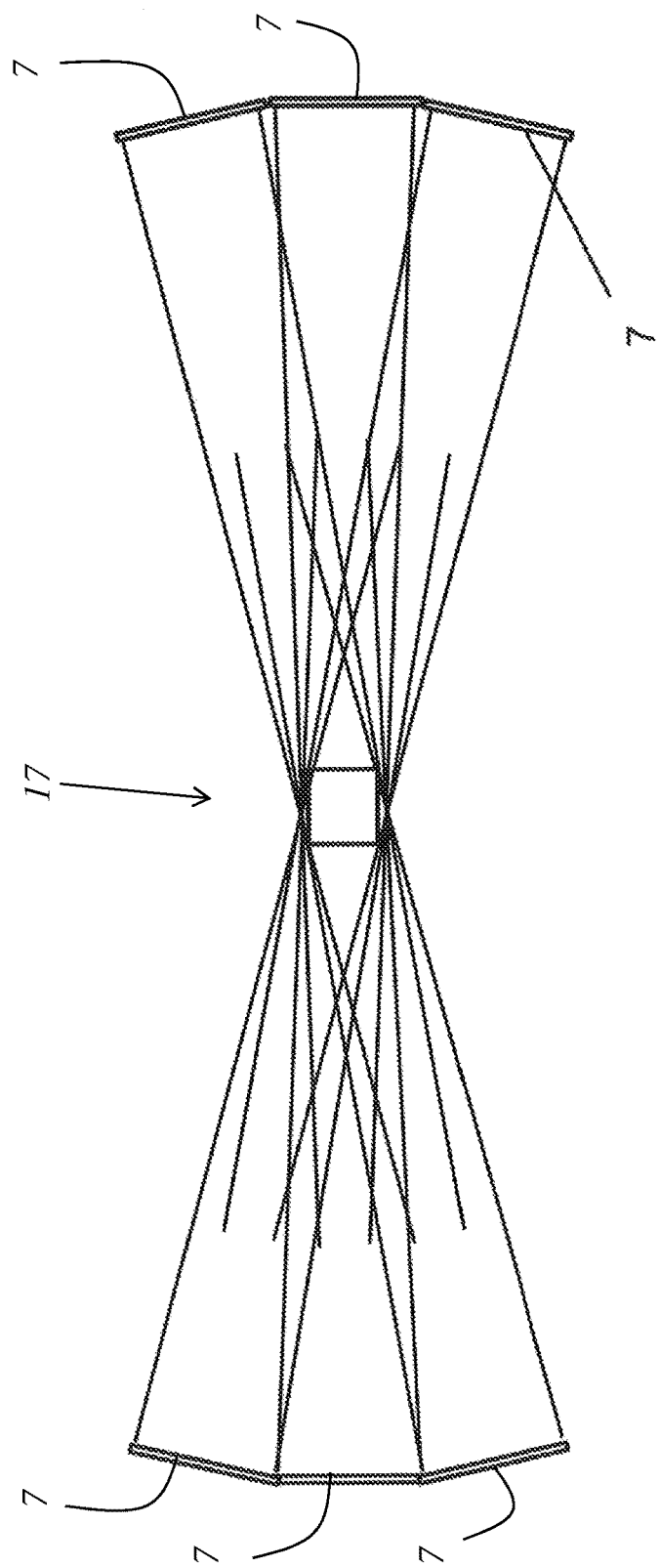
FIG. 5 Is a schematic view depicting another possible manifestation of the diverting device.

FIG. 5 is a schematic view depicting another possible manifestation of the diverting device, having multiple diverting mirrors 7 that are arranged on oppositely located sides each along a circular arc. A diverting device 4 of this kind, like the diverting devices shown in FIGS. 6 and 7 as well, is very particularly suitable for isocentric and/or stereotactic impingement upon a sample region from multiple different directions.

Figure 6:
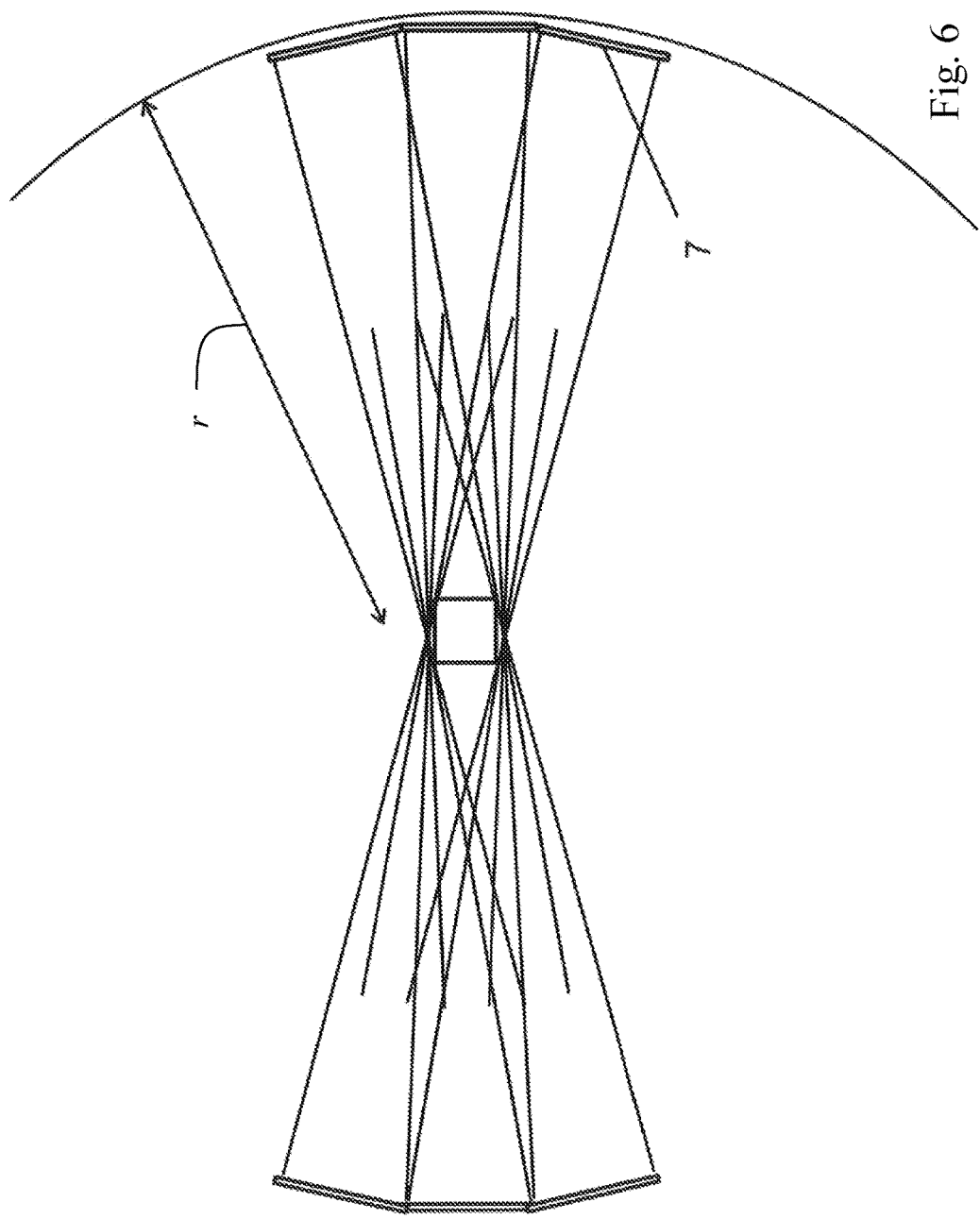
FIG. 6 Is a schematic view depicting a possible diverting device having multiple curved reflecting elements that are arranged along a circular arc.

FIG. 6 is a schematic view depicting one possible diverting device 4 having multiple curved diverting mirrors 7 that are arranged along a circular arc. The radius of curvature of diverting mirror 7 is preferably equal to more than twice the radius r of the circular arc.

Figure 7:
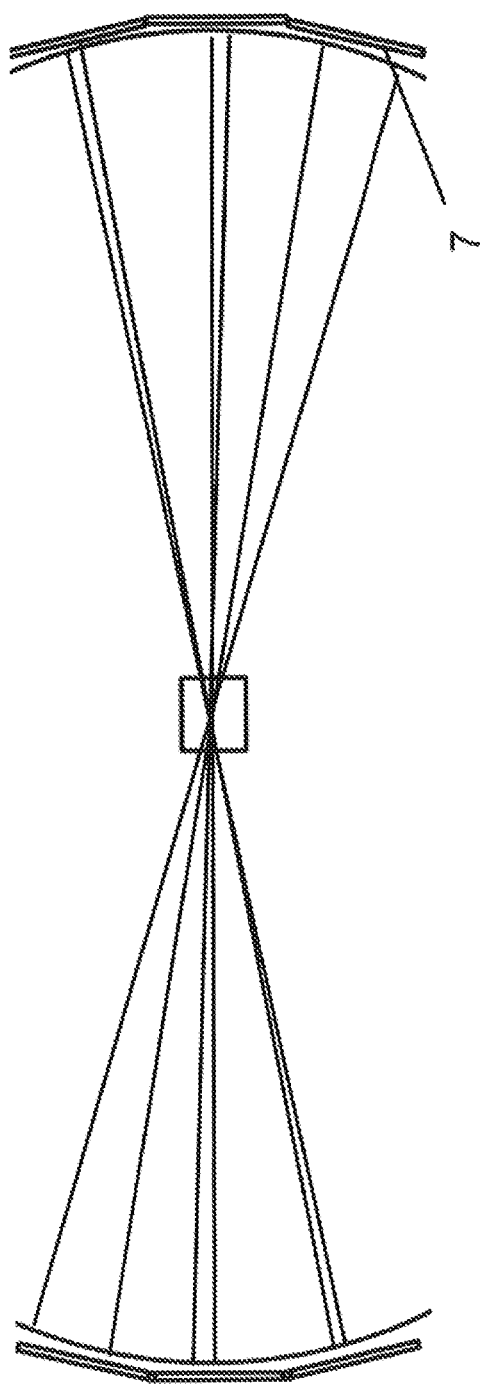
FIG. 7 Is a schematic view depicting a further possible diverting device having multiple curved and reflecting elements.

FIG. 7 is a schematic view showing a further advantageous diverting device 4 having curved diverting mirrors 7 arranged opposite one another and along a circular arc of predefinable length. The radius of curvature of diverting mirrors 7 corresponds to the radius of the circular arc, so that focusing of the light reflected by reflecting element 7 exists at the center of the circle formed by the circular arc. All the reflected beams meet at the center, so that maximum loading can occur in a selected sample region by way of stereotactic illumination. The sample region can be positioned in the center, for example, by displacing the sample with the aid of a displacement stage, suitable adjustable preferably in all three spatial directions, on which the sample is mounted. The displacement stage can be configured, in particular, to be adjustable in motorized fashion.

Versatile utilization of the optical arrangement can be ensured on the basis of the diverting devices depicted in FIGS. 5 to 7. Regardless of the concrete arrangement and configuration of the individual diverting elements, each diverting device can be embodied as a pre-packaged attachment, in particular as a pre-packaged attachment for fastening to an objective and/or detection objective. The attachment having the mirror element arrangement then simply needs to be exchanged in order to change between different applications.

To avoid repetition, the reader is referred to the general portion of the description, and to the appended claims, with regard to further advantageous embodiments of the optical arrangement according to the present invention.

Lastly, be it noted expressly that the exemplifying embodiment described above serves only for discussion of the teaching that is claimed, but does not limit it to the exemplifying embodiment.

What is claimed is:

1. A method in which a sample is manipulated with manipulation light, comprising:
    imaging the sample using a single plane illumination microscopy SPIM technique under illumination with illumination light or excitation light for fluorescence excitation, in the form of an illumination light sheet;
    focusing both the manipulation light and the illumination light by at least one objective brought into an objective working position; and
    diverting at least one of the manipulation light or the illumination light, after passing through the at least one objective, using a diverting device to propagate the manipulation light or illumination light at an angle different from zero degrees with respect to an optical axis of the at least one objective.

2. The method according to claim 1, further comprising directing the manipulation light and the illumination light onto the sample from different directions.

3. The method according to claim 1, wherein
   a. the illumination light sheet is a quasi-light sheet that is made up of an illumination light bundle moved continuously back and forth, or
   b. the illumination light sheet is a quasi-light sheet that is made up of an illumination light bundle moved continuously back and forth using a beam deflection apparatus adjustable in terms of deflection angle, or
   c. the illumination light sheet is generated using a cylindrical optic.

4. The method according to claim 1, further comprising illuminating the sample simultaneously with the manipulation light and the illumination light.

5. The method according to claim 1, further comprising:
   a. illuminating the sample successively in time firstly with the manipulation light and then with the illumination light; or
   b. illuminating the sample successively in time firstly with the illumination light and then with the manipulation light; or
   c. illuminating the sample alternately with the illumination light and the manipulation light.

6. The method according to claim 1, wherein the diverting device diverts the illumination light at an angle greater than 10 degrees with respect to the optical axis of the at least one objective, and wherein the manipulation light strikes the sample without diversion.

7. The method according to claim 1, further comprising diverting at least one of the illumination light or the manipulation light onto the diverting device using a beam deflection device adjustable in terms of deflection angle.

8. The method according to claim 1, wherein
   a. the diverting device comprises multiple diverting means or multiple diverting mirrors; or
   b. the diverting device comprises multiple different or differently arranged or differently aligned diverting means or multiple diverting mirrors.

9. The method according to claim 1, comprising:
   a. impinging upon the sample in a same sample region to be manipulated with the manipulation light from multiple different directions; or
   b. impinging upon the sample region to be manipulated with the manipulation light isocentrically or stereotactically; or
   c. moving the manipulation light, constituting a manipulation light beam, on a conical surface using a beam deflection device and via at least one said diverting device downstream from the at least one objective; or
   d. modifying a power level of the manipulation light during a manipulation or during a beam deflection.

10. The method according to claim 1, further comprising:
    a. passing through or collimating detected light proceeding from the sample with the at least one objective for focusing the illumination light; or
    b. passing through or collimating detected light proceeding from the sample with a detection objective different from the at least one objective for focusing the illumination light and the manipulation light.

11. The method according to claim 10, further comprising aligning the optical axis of the at least one objective, and an optical axis of the detection objective, with one another in parallel or collinear fashion.

12. The method according to claim 10, further comprising:
    a. movably arranging the diverting device and the at least one objective relative to one another; or
    b. movably fastening the diverting device on the at least one objective; or
    c. movably fastening the diverting device on the detection objective; or
    d. rotatably arranging the diverting device around the detection objective or around an optical axis of the detection objective.

13. The method according to claim 1, further comprising producing a two-photon excitation by using at least one of the manipulation light or the illumination light.

14. An optical arrangement for manipulating a sample with manipulation light, the arrangement comprising:
    a single plane illumination microscopy SPIM arrangement for imaging the sample under illumination with illumination light or excitation light for fluorescence excitation using an illumination light sheet;
    at least one objective brought into an objective working position for focusing both the manipulation light and the illumination light; and
    at least one diverting device located downstream from the at least one objective arranged in the objective working position for diverting the illumination light or the manipulation light.

15. The optical arrangement according to claim 14, wherein the illumination light and the manipulation light strike the sample from different directions.

16. The optical arrangement according to claim 14, wherein
    a. the illumination light sheet is a quasi-light sheet that is made up of an illumination light bundle moved continuously back and forth, or
    b. the illumination light sheet is a quasi-light sheet that is made up of an illumination light bundle moved continuously back and forth using a beam deflection apparatus adjustable in terms of deflection angle, or
    c. a cylindrical optic is present which generates the illumination light sheet.

17. The optical arrangement according to claim 14, wherein the sample can be illuminated simultaneously with the manipulation light and the illumination light.

18. The optical arrangement according to claim 14, wherein
    a. the sample can be illuminated successively in time firstly with the manipulation light and then with the illumination light; or
    b. the sample can be illuminated successively in time firstly with the illumination light and then with the manipulation light; or
    c. the sample can be illuminated alternately with the illumination light sheet and the manipulation light.

19. The optical arrangement according to claim 14, wherein the illumination light is diverted with the diverting device at an angle greater than 10 degrees, with respect to the optical axis of the at least one objective, and wherein the manipulation light strikes the sample without diversion.

20. The optical arrangement according to claim 14, wherein at least one of the illumination light and the manipulation light is directed onto the diverting device using a beam deflection device adjustable in terms of deflection angle.

21. The optical arrangement according to claim 14, wherein the diverting device comprises multiple different or differently arranged or differently aligned diverting means or diverting mirrors, for diversion of the illumination light focused in the at least one objective located in the objective working position or of the manipulation light focused in the at least one objective located in the objective working position.

22. The optical arrangement according to claim 14, wherein
   a. the sample, in a same sample region to be manipulated, is impinged upon with the manipulation light from multiple different directions; or
   b. the sample region to be manipulated is impinged upon with the manipulation light isocentrically or stereotactically; or
   c. the manipulation light, constituting a manipulation light beam, is moved on a conical surface using a beam deflection device and via at least one diverting device downstream from the at least one objective; or
   d. a power level modification apparatus modifies a power level of the manipulation light during a beam deflection.

23. The optical arrangement according to claim 14, wherein
   a. detected light proceeding from the sample passes through or is collimated with the at least one objective that focuses the illumination light; or
   b. detected light proceeding from the sample passes through or is collimated with a detection objective that is different from the objective that focuses at least one of the illumination light and the manipulation light.

24. The optical arrangement according to claim 23, wherein the optical axis of the at least one objective that focuses at least one of the illumination light or the manipulation light, and the optical axis of the detection objective, are aligned with one another in parallel or collinear fashion.

25. The optical arrangement according to claim 14, wherein
   a. the diverting device and the at least one objective that focuses at least one of the illumination light and the manipulation light are arranged movably relative to one another; or
   b. the diverting device is fastened movably on the at least one objective that focuses the illumination light or the manipulation light; or
   c. the diverting device is fastened movably on the detection objective; or
   d. the diverting device is arranged rotatably around the detection objective or around the optical axis of the detection objective.

26. The optical arrangement according to claim 14, wherein
   a. a two-photon excitation can be brought about using at least one of the manipulation light and the illumination light; or
   b. a pulsed laser or a picosecond or femtosecond laser is present in order to generate at least one of the illumination light and the manipulation light.

27. The optical arrangement according to claim 14, wherein the optical apparatus is produced by converting a scanning microscope or a confocal scanning microscope and the optical arrangement contains a scanning microscope or a confocal scanning microscope.

* * * * *